United States Patent
Hajduk et al.

(10) Patent No.: US 12,352,399 B2
(45) Date of Patent: Jul. 8, 2025

(54) ILLUMINATION DEVICE FOR A MOTOR VEHICLE LIGHT

(71) Applicant: ZKW Group GmbH, Wieselburg (AT)

(72) Inventors: Peter Hajduk, Krásno nad Kysucou (CZ); Martin Hamar, Olomouc (CZ); Michal Tomecek, Hlučín (CZ); Jiří Jahn, Březová (CZ); Christian Maier, Oberndorf an der Melk (AT); Christian Muellauer, Frankenfels (AT); Dominik Fallmann, Lackenhof (AT); Martin Gremlica, Dětkovice (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/778,935

(22) Filed: Jul. 20, 2024

(65) Prior Publication Data

US 2025/0027626 A1    Jan. 23, 2025

(30) Foreign Application Priority Data

Jul. 21, 2023  (EP) ..................... 23186976

(51) Int. Cl.
*F21S 41/24* (2018.01)
*F21S 41/275* (2018.01)
(Continued)

(52) U.S. Cl.
CPC ............. *F21S 41/24* (2018.01); *F21S 41/275* (2018.01); *F21S 41/337* (2018.01);
(Continued)

(58) Field of Classification Search
CPC ........ F21S 41/24; F21S 41/275; F21S 41/337; F21S 43/239; F21S 43/245; F21S 43/31; F21S 43/2621
See application file for complete search history.

(56) References Cited

U.S. PATENT DOCUMENTS

| | | |
|---|---|---|
| 2006/0050282 A1 | 3/2006 | de Lamberterie |
| 2020/0256539 A1 | 8/2020 | Gloss et al. |

(Continued)

FOREIGN PATENT DOCUMENTS

| | | |
|---|---|---|
| DE | 102008016764 A1 | 10/2009 |
| DE | 102011077316 A1 | 12/2012 |

(Continued)

OTHER PUBLICATIONS

Extended European Search Report for European Patent Application No. 23186976.9 dated Nov. 21, 2023 (38 Pages).

*Primary Examiner* — Christopher E Dunay
(74) *Attorney, Agent, or Firm* — Eversheds Sutherland (US) LLP

(57) ABSTRACT

An illumination device for a motor vehicle light has a plate-like transparent light guiding body (LGB). Light sources are arranged on a narrow side of the LGB and emit light that enters the LGB and propagates therein in a first main light propagation direction ($X_1$) to the opposite narrow side. At least some of the light rays (S1), incident on the front main surface (FMS) of the light propagating in the $X_1$ direction are totally reflected at the FMS such that the light strikes a rear main surface (RMS), which has an exit structure. At least some of the light rays (S1') which are totally reflected at the FMS and which strike the RMS exit the LGB via the exit structure. A reflector surface, which is arranged opposite the RMS, is designed such that light rays (S1") emerging from the RMS and striking the reflector surface are deflected by the reflector surface in the direction of the LGB in a second light propagation direction ($X_2$) and the deflected light rays (S1''') pass through the RMS and the FMS and are emitted into an area in front of the illumination device to form a light distribution.

19 Claims, 5 Drawing Sheets

(51) Int. Cl.
*F21S 41/33* (2018.01)
*F21S 43/20* (2018.01)
*F21S 43/239* (2018.01)
*F21S 43/245* (2018.01)
*F21S 43/31* (2018.01)
*F21W 103/10* (2018.01)
*F21W 103/35* (2018.01)

(52) U.S. Cl.
CPC ........... *F21S 43/239* (2018.01); *F21S 43/245* (2018.01); *F21S 43/2621* (2024.05); *F21S 43/31* (2018.01); *F21W 2103/10* (2018.01); *F21W 2103/35* (2018.01)

(56) References Cited

U.S. PATENT DOCUMENTS

| | | | |
|---|---|---|---|
| 2022/0120402 A1 | 4/2022 | Woodgate et al. | |
| 2023/0349530 A1* | 11/2023 | Li | F21S 43/243 |
| 2024/0093853 A1* | 3/2024 | Mahel | F21S 43/315 |
| 2024/0190330 A1* | 6/2024 | Jung | F21S 41/24 |
| 2024/0210009 A1* | 6/2024 | Schwenkbeck | G02B 1/041 |
| 2024/0426443 A1* | 12/2024 | Vollmer | F21S 41/40 |

FOREIGN PATENT DOCUMENTS

| | | |
|---|---|---|
| FR | 3061537 A1 | 7/2018 |
| JP | 2013235729 A | 11/2013 |
| JP | 2014082041 A | 5/2014 |

* cited by examiner

ILLUMINATION DEVICE FOR A MOTOR VEHICLE LIGHT

CROSS-REFERENCE TO RELATED APPLICATIONS

This application claims priority to European Patent Application No. 23186976.9, filed Jul. 21, 2023, which is incorporated herein by reference.

FIELD OF THE INVENTION AND DESCRIPTION OF PRIOR ART

The invention relates to an illumination device for a motor vehicle light, wherein the illumination device comprises: an in particular plate-like transparent light guiding body, wherein the light guiding body is delimited by two opposite main surfaces, a front main surface and a rear main surface as well as side surfaces, one or more light sources, wherein the light sources are arranged on at least one narrow side, wherein the light emanating from a light source enters the light guiding body via the narrow side on which the light source is arranged and propagates in the light guiding body substantially in a first main light propagation direction to that narrow side which lies opposite the narrow side via which the light from the light source enters.

Thin light modules with a high degree of surface homogeneity can be produced with such a plate-like light guiding body and are now used as an OLED alternative. Most of the solutions that are already known are based on a thin plate with LEDs, the light of which is injected into the edge of the plate, wherein the light from the plate is decoupled in the desired direction, usually perpendicular to the plate surface/front main surface. However, with the devices that are already known, the light decoupled from the plate is not very uniform and requires additional diffusion layers to achieve the desired OLED-like uniformity. The not very effective method of light extraction with additional diffusion layers means that strong signal functions such as STOP, TURN or DRL can only be achieved with great difficulty or only if the front main surface or light exit surface of the plate has a large area.

SUMMARY OF THE INVENTION

It is an object of the invention to provide an illumination device with a plate-like light guiding body which has as thin a design as possible with a higher degree of surface homogeneity at the same time.

This object is achieved with an illumination device mentioned in the introduction, in which the front main surface is designed in such a way that at least some, preferably all of the light rays, incident on the front main surface, of the light propagating substantially in the first main light propagation direction are totally reflected at the front main surface such that they can strike the rear main surface, and wherein the rear main surface has an exit structure, and wherein at least some of the light rays which are totally reflected at the front main surface and which strike the rear main surface exit the light guiding body via the exit structure, and wherein a reflector surface is arranged opposite the rear main surface, wherein the reflector surface is designed in such a way that light rays emerging from the rear main surface and striking the reflector surface are deflected by the reflector surface in the direction of the light guiding body, in particular substantially in a second light propagation direction and the deflected light rays pass through the rear main surface and the front main surface of the light guiding body and are emitted into an area in front of the illumination device to form a light distribution, wherein the exit structure is formed in the rear main surface in the form of profile recesses or in the form of profile elevations, which protrude from the rear main surface, wherein the reflector surface is formed from reflector partial surfaces, wherein a reflector partial surface lies opposite each profile recess or each profile elevation, and wherein the reflector partial surfaces are concave in cross-sectional areas normal to their longitudinal direction, in particular as concave recesses in a reflector element.

The phrasing "substantially in a light propagation direction" is intended to mean that the resulting direction vector of the respective light beam is directed in this direction, although the individual light rays may deviate from this direction.

The first light propagation direction and the second light propagation direction are preferably orthogonal to one another.

A very thin arrangement as viewed in a light propagation direction can be achieved with the present embodiment according to the invention, in which it can be ensured at the same time that the front main surface via which the light injected by the light sources is emitted in the desired light propagation direction emits light as uniformly as possible.

It is preferably provided that the rear main surface is formed from a flat surface.

It can further be provided that a narrow side which lies opposite a narrow side via which one or more light sources feed light into the light guiding body is designed to be retroreflecting or as a retroreflector such that at least some of the light which propagates in the light guiding body and which strikes the retroreflecting narrow side is reflected back, in particular totally reflected, into the light guiding body.

In this way, the light that enters the light guiding body can be used as efficiently as possible.

It can be provided that all light sources are arranged exactly on one narrow side.

If there are several light sources on a narrow side, it is preferably provided that these are arranged next to one another, along a longitudinal extension of the narrow side, wherein the light sources are preferably arranged in such a way that the main light emission directions of the light emerging from the light sources run parallel to one another.

It can be provided that the exit structure comprises first surfaces, in particular flat first surfaces, which are arranged orthogonal to the second light propagation direction, and second flat surfaces, in particular flat second surfaces, which are not arranged orthogonal to the second light propagation direction, for example parallel to the second light propagation direction.

It can be provided that the profile recesses or profile elevations run transverse to the first light propagation direction, in particular orthogonal to the first light propagation direction.

Furthermore, these preferably also run transverse to the second light propagation direction and in particular also substantially orthogonal thereto.

Profile recesses or profile elevations preferably extend over an entire first width, i.e. from a narrow side to the narrow side opposite this narrow side, in terms of their longitudinal extension, and/or profile recesses or profile elevations are provided in or on the flat surface over an entire second width, which extends from a narrow side to the narrow side opposite this narrow side.

Light that strikes the profile recesses or profile elevations can exit the light guiding body to the rear via these. If the light guiding bodies were formed on the rear main surface as a continuous flat surface, for example, most of the light would be totally reflected and not exit the light guiding body.

It can in particular be provided that all profile recesses or all profile elevations are identical in terms of their height and/or width, and/or all profile recesses or profile elevations respectively have the same distance to their neighbouring profile recesses or profile elevations, and/or all profile recesses or all profile elevations run parallel to one another.

Furthermore, it is preferably provided that each reflector partial surface extends over the entire longitudinal extension of the associated profile recess or profile elevation in terms of its longitudinal extension, and wherein the reflector partial surfaces preferably run in the longitudinal direction parallel to a longitudinal direction of the associated profile recess or profile elevation.

Furthermore, it can be provided that in cross-sectional areas normal to the longitudinal direction of the reflector partial surfaces, the profile recesses or profile elevations are respectively formed mirror-symmetrically with respect to a line of symmetry of the reflector partial surface associated with them.

It can be provided that the profile recesses or profile elevations have a rectangular, square or trapezoidal cross-section.

Furthermore, it can be provided that in the cross-sectional areas, the reflector partial surfaces have a parabolic shape.

In this way, the reflected light rays can be directed in parallel.

Furthermore, it is advantageously provided that all reflector partial surfaces are identical in terms of their shape, and/or neighbouring reflector partial surfaces are directly adjacent to one another and, for example, respectively converge in a common edge.

In addition, it can be provided that a transparent, plate-like light shaping element is arranged downstream of the light guiding body as viewed in the second main light propagation direction, which light shaping element has a light shaping structure with a plurality of facets, which respectively have an inclination to the second main light emission direction.

This light shaping element can, on the one hand, further improve the uniformity of the light and, on the other hand, the light shaping structure can also deflect the light in a targeted manner in a desired direction or into a desired region.

For example, it is provided in this context that the spatial vector of a facet forms a first, e.g. horizontal angle of inclination and a second, e.g. vertical angle of inclination to the second main light emission direction, wherein the angles of inclination of all facets are distributed in such a way that the horizontal angles of inclination and the vertical angles of inclination are respectively distributed around an expected value, wherein the expected value corresponds to the maximum luminous intensity of the light distribution in such a way that light rays that enter the light shaping element and/or exit the light guiding body via facets that have a horizontal and vertical angle of inclination corresponding to the expected value form the maximum luminous intensity of the light distribution, wherein the light shaping structure forms a light entry side and/or a light exit side of the light shaping element.

The facets can be arranged in such a way that they are distributed substantially uniformly on the light entry side and/or light exit side of the light shaping element in relation to their respective inclinations.

It can further be provided that the front main surface of the light guiding body is a flat surface, which preferably runs parallel to the flat surface of the second main surface.

For example, it can be provided that a second, transparent, plate-like light guiding body is arranged downstream of the light shaping element as viewed in the second main light propagation direction, wherein the second light guiding body is preferably designed in such a way that light rays coming from the reflector surface are scattered as they pass through the second light guiding body.

In particular, it can be provided that one or more further so-called second light sources are provided, which inject light into the second light guiding body via one or more narrow surfaces of the second light guiding body, and wherein the second light guiding body is designed in such a way that light injected by the one or more second light sources is scattered by the light guiding body and exits the light guiding body in a direction facing away from the reflector surface.

This arrangement can provide a further, second light function, for example as a design element or lighting function that does not have great requirements in terms of intensity or uniformity, for example as a position light or rear light.

The second light sources and the (first) light sources can preferably be controlled independently of one another.

Light from the first light sources is also scattered and diffuse light is produced, but the facets described can still be used to achieve a targeted maximum in the intensity distribution.

In this optional embodiment, the present invention combines a new approach for an effective optical system for light decoupling, a crystal optical modulator and a volume-scattering material. Each function can be differentiated by the illuminated appearance, e.g. the rear provides a homogeneous illuminated surface, when switched to STOP, for example, the same illumination device has a crystalline appearance and can meet the legal requirements for a STOP signal.

It is preferably provided that a light injection element is respectively arranged between each light source and the light guiding body, wherein the light emitted by a light source enters the light injection element associated with this light source and is injected by it into the light guiding body such that the light propagates in the light guiding body substantially in the first main light propagation direction.

Finally, the invention relates to a motor vehicle light having at least one illumination device described above.

The motor vehicle light can be designed, for example, as a motor vehicle headlight or tail light or can be arranged in a motor vehicle headlight or in a tail light.

BRIEF DESCRIPTION OF THE DRAWINGS

The invention is explained in more detail below based on the drawings.

DETAILED DESCRIPTION OF EMBODIMENTS OF THE INVENTION

Figure 1:
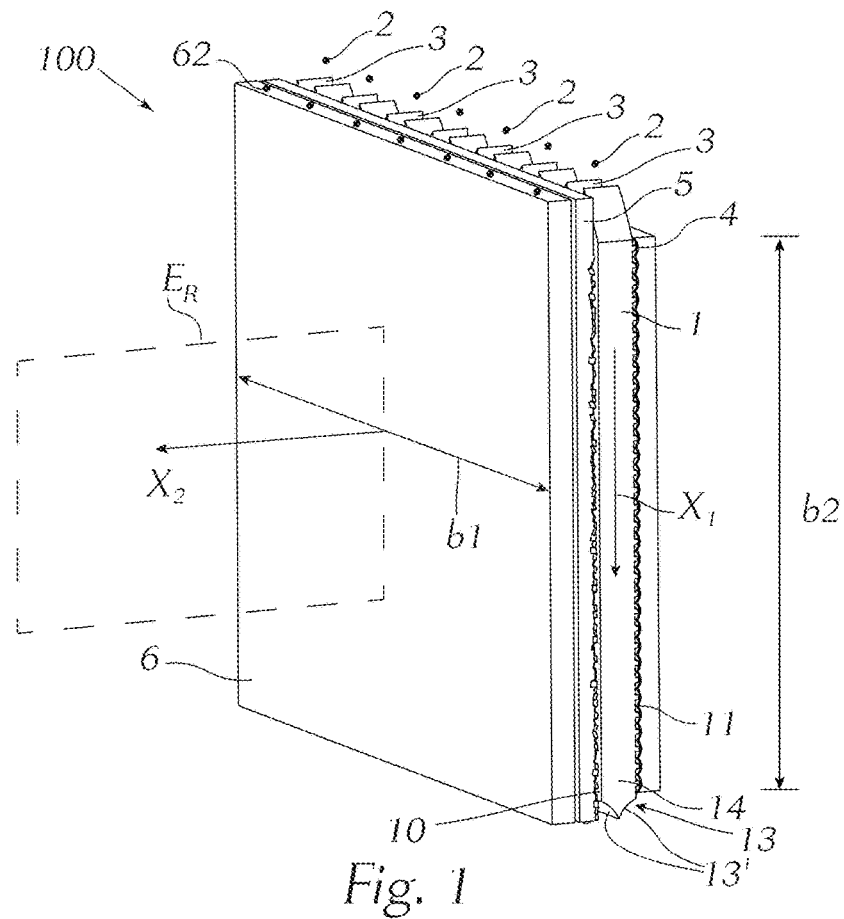
FIG. 1 shows a perspective view of an illumination device for a motor vehicle headlight from diagonally in front.
Figure 2:
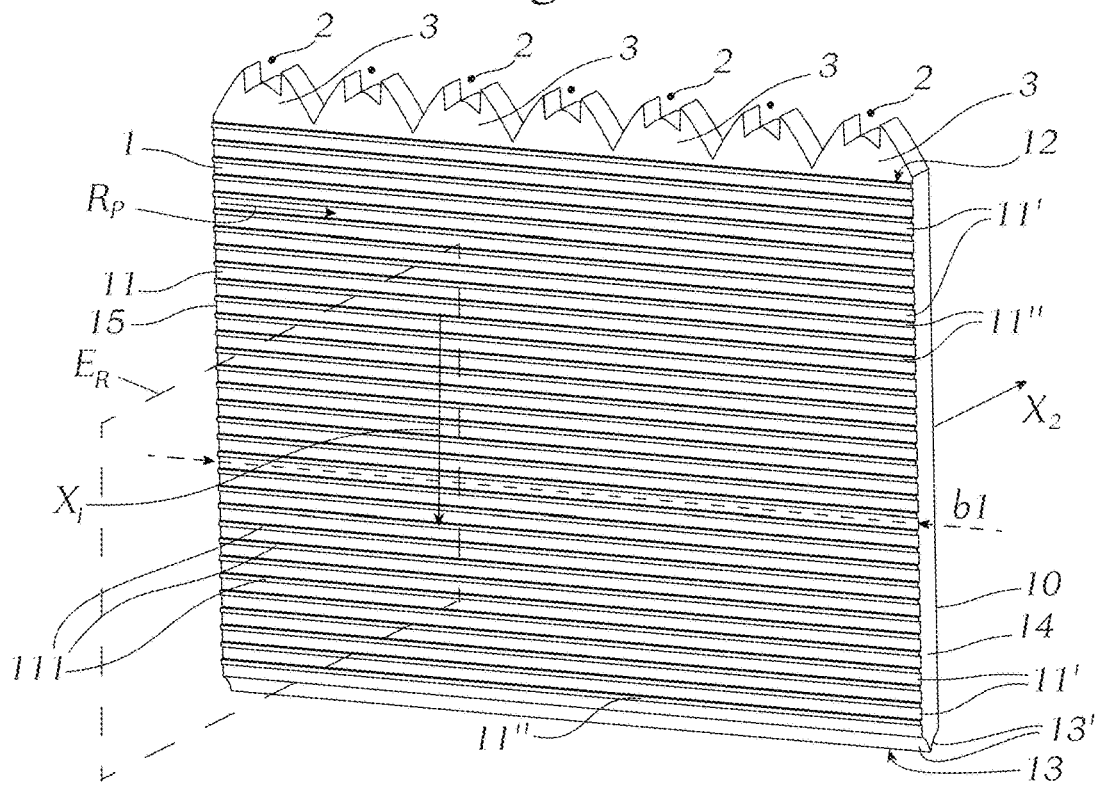
FIG. 2 shows a view of the light guiding body used in the illumination device shown in FIG. 1.

FIG. 1 shows an illumination device 100 for a motor vehicle light, wherein the illumination device 100 comprises an in particular plate-like light guiding body 1 made from an optically transparent material, wherein the light guiding body 1, as can also be seen in FIG. 2, is delimited by two opposite main surfaces, a front main surface 10 and a rear main surface 11 as well as side surfaces 12, 13, 14, 15. The front main surface 10 of the light guiding body 1 is preferably a flat surface and runs parallel to a flat surface 11' (see the explanations below) of the second main surface 11.

The illumination device 100 comprises a plurality of light sources 2, wherein the light sources 2 are arranged on a narrow side 12 of the light guiding body 1. The light emitted by the light sources 2 enters the light guiding body 1 via the narrow side 12 and propagates therein substantially in direction $X_1$ to that narrow side 13 which lies opposite the narrow side 12 via which the light from the light sources 2 enters, the so-called first main light propagation direction $X_1$.

It is preferably provided as shown that a light injection element 3, for example in the form of a collimator, is respectively arranged between each light source 2 and the light guiding body 1, wherein the light emitted by a light source 2 enters the light injection element 3 associated with this light source 2 and is injected by it into the light guiding body 1 such that the light propagates in the light guiding body 1 substantially in the first main light propagation direction $X_1$.

On the one hand, this light injection element 3 captures the light emitted by the associated light source 2 as completely as possible, and on the other hand this light is aligned in the direction of the first light propagation direction $X_1$, but in such a way that rays can strike the front and rear main surface 10, 11 as they propagate in the light guiding body 1, wherein at least some, preferably most or all of the incident light rays are totally reflected at the front main surface 10.

The light sources 2 are preferably arranged next to one another, along a longitudinal extension of the narrow side 12, wherein the light sources 2 are arranged in such a way that the main light emission directions of the light emerging from the light sources 2 run parallel to one another.

As already described, the front main surface 10 is designed or arranged in such a way or the geometric relationships are such that at least some, preferably all of the light rays S1, incident on the front main surface 10, of the light propagating substantially in the first main light propagation direction $X_1$ (or preferably also opposite to the first main light propagation direction, see below) are totally reflected at the front main surface 10 and can reach the rear main surface 11 (light rays S1'), and wherein the rear main surface 11 has an exit structure 111 such that at least some of the light rays S1' which are totally reflected at the front main surface 10 and which strike the rear main surface 11 exit the light guiding body 1 via this exit structure 111.

The illumination device 100 further comprises a reflector surface 40 opposite the rear main surface 11, wherein the reflector surface 40 is designed in such a way that light rays S1" emerging from the rear main surface 11 via the exit structure 111 and striking the reflector surface 40 are deflected by the reflector surface 40 in the direction of the light guiding body 1, in particular substantially in a second light propagation direction $X_2$ and the deflected light rays S1''' pass through the rear main surface 11 and the front main surface 10 of the light guiding body 1 and are emitted into an area in front of the illumination device 100 to form a light distribution LV.

In addition, light rays that propagate in the first main light propagation direction $X_1$ (or preferably also in the opposite direction, see below) and impinge directly, i.e. without prior total reflection at the front main surface 10, on the rear main surface 11, can also emerge from the light guiding body 1 and be reflected at the reflector surface 40 in the second main light propagation direction $X_2$ and contribute to the light distribution LV.

As shown in FIGS. 1 & 2, the narrow side 13 which lies opposite the narrow side 12 via which light is injected from the light sources 2 into the light guiding body 1 is advantageously designed to be retroreflecting or as a retroreflector 13' such that at least some of the light which propagates in the light guiding body 1 and which strikes the retroreflecting narrow side 13 is totally reflected back into the light guiding body 1 and can thus be utilized when it emerges from the light guiding body 1 via the rear main surface 10 and is reflected by the reflector surface 40 in the second light propagation direction $X_2$.

Figure 6:
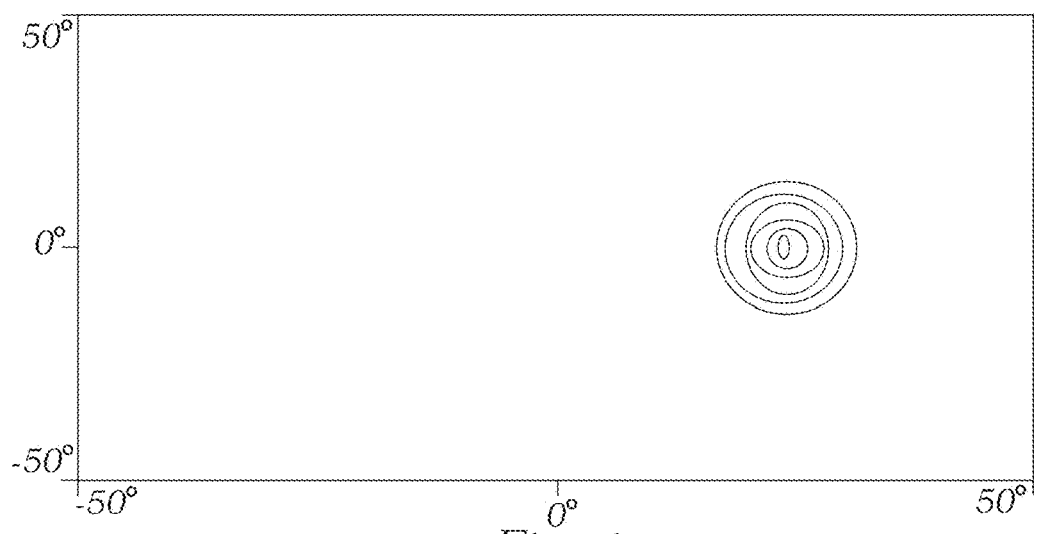
FIG. 6 shows a photometric illustration of a light distribution produced by means of the light rays reflected by the reflector of the light coming from first light sources.
Figure 7:
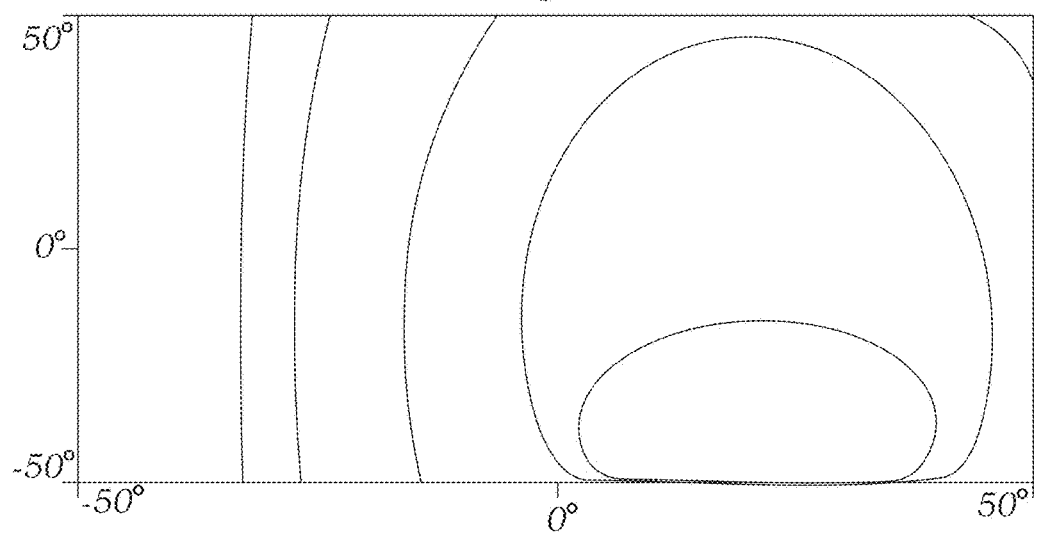
FIG. 7 shows a photometric illustration of a light distribution produced by means of second light sources and scattering of the light at a further, second light guiding body.

FIG. 6 schematically shows a light distribution, which is exclusively produced with the light reflected by the reflector surface 40.

Figure 4:
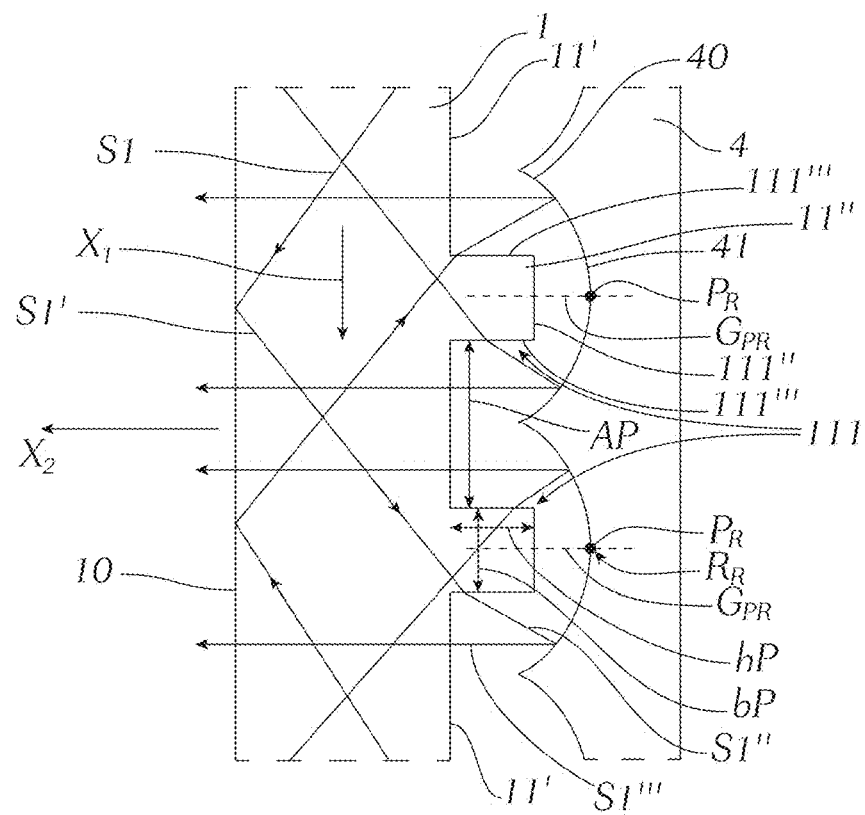
FIG. 4 shows a sectional view of the illumination device along a plane ER in the region of the light guiding body and the reflector surface.

As shown in particular in FIG. 4, the exit structure 111 of the rear main surface 11 has profile elevations 11", which protrude from the rear main surface 11. In the example shown, the rear main surface 11 is, as already mentioned above, designed as a flat surface 11', from which these profile elevations 11" protrude.

Figure 3:
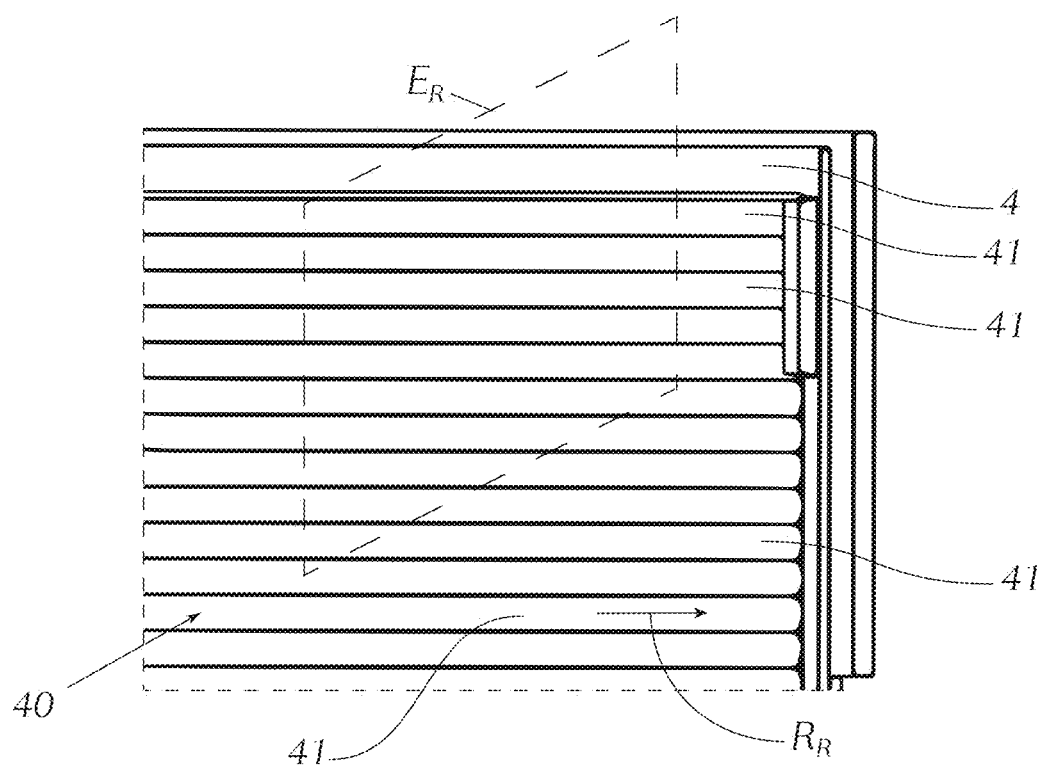
FIG. 3 shows a view of the reflector surface used in the illumination device shown in FIG. 1.

The reflector surface 40 is preferably, as shown in FIG. 3, formed on a reflector element or reflector body 4. The reflector surface 40 is formed from reflector partial surfaces 41, wherein a reflector partial surface 41 lies opposite each profile elevation 11".

The reflector surface 40 is preferably a mirrored, e.g. metallized reflector.

As shown in FIG. 4, the reflector partial surfaces 41 are, for example, concave in cross-sectional areas $E_R$, which run in particular vertically, normal to their longitudinal direction $R_R$, in particular as concave recesses in the reflector element 4.

The reflector surface 40, in particular the reflector partial surfaces 41, are designed in such a way that light impinging on them is reflected in the second main light propagation direction $X_2$. The second main light propagation direction $X_2$ runs, for example, orthogonal to the flat surface 11' of the rear main surface 11 and/or orthogonal to the first main light propagation direction $X_1$.

Accordingly, the light reflected by the reflector partial surfaces 41 can enter the light guiding body 1 via the flat surface 11' of the rear main surface 11 and propagate through this to the front main surface 10 without deflection of the propagation direction, where it exits the light guiding body 1 again.

It can be provided that the exit structure 111 comprises flat first surfaces 111", which are arranged orthogonal to the second light propagation direction $X_2$, and second surfaces, in particular flat second surfaces 111''' (side surfaces), which are not arranged orthogonal to the second light propagation direction $X_2$, for example parallel to the second light propagation direction $X_2$.

In the example shown, it is specifically provided that the profile elevations 11" have a rectangular or square cross-section.

The embodiment is preferably such that light only strikes the side surfaces of the respective reflector 41, but not a surface of the reflector that lies opposite the flat first surface 111" of the profile elevation 11". This is achieved by virtue of the fact that the embodiment is such that light is mainly or preferably exclusively coupled out at the side surfaces (second surfaces 111''') of the profile elevations 11" so that it is directed parallel by the in particular parabolic reflector 41.

The profile elevations 11" run, for example, as shown (FIG. 2) transverse to the first light propagation direction $X_1$, in particular orthogonal to the first light propagation direction $X_1$. In addition, these preferably also run transverse to the second light propagation direction $X_2$ and in particular also substantially orthogonal thereto.

The profile elevations 11" preferably extend over an entire first width b1 of the light guiding body 1, i.e. from a narrow side 14 to the narrow side 15 opposite this narrow side 14, in terms of their longitudinal extension, and they are preferably arranged over an entire second width (or height) b2, which extends from the narrow side 12 with the light sources 2 to the narrow side 13 opposite this narrow side 12.

As already described, light that strikes the profile elevations 11" can exit the light guiding body to the rear via these. If the light guiding body 1 were formed on the rear main surface as a continuous flat surface, for example, most of the light would be totally reflected and not exit the light guiding body 1.

It is further preferably provided that all profile elevations 11" are identical in terms of their height hP and/or their width bP. The profile elevations preferably respectively have the same distance AP to their neighbouring profile elevations. In particular, all profile elevations run parallel to one another. (see FIG. 4)

In terms of the reflector partial surfaces 41, as can be seen inter alia in FIG. 3, it is advantageously provided that each reflector partial surface 41 extends over the entire longitudinal extension of the associated profile elevation 11" in terms of its longitudinal extension, wherein each reflector partial surface 41 preferably runs in the longitudinal direction $R_R$ parallel to a longitudinal direction $R_P$ of the profile elevation 41 associated with it.

It is further preferably provided that in cross-sectional areas $E_R$ normal to the longitudinal direction $R_R$ of the reflector partial surfaces 41, the profile elevations 11" are respectively formed mirror-symmetrically with respect to a line of symmetry $G_{PR}$ (FIG. 4) of the reflector partial surface 41 associated with them.

The reflector partial surface 41 itself is mirror-symmetrical in the cross-sectional area $E_R$ (i.e. the resulting intersection curve by intersecting the reflector partial surface 41 with the cross-sectional area $E_R$) with respect to a line of symmetry $G_{PR}$, which intersects the reflector partial surface 41 in the cross-sectional area $E_R$ at a point PR and is normal to the intersection curve.

It is preferably provided that in the cross-sectional areas $E_R$, the reflector partial surfaces 41 have a parabolic shape. In this way, the reflected light rays can be directed in parallel.

Similarly to the profile elevations 11", it is advantageously provided that all reflector partial surfaces 41 are identical in terms of their shape, wherein neighbouring reflector partial surfaces 41 are preferably directly adjacent to one another and, for example, respectively converge in a common edge.

Figure 9:
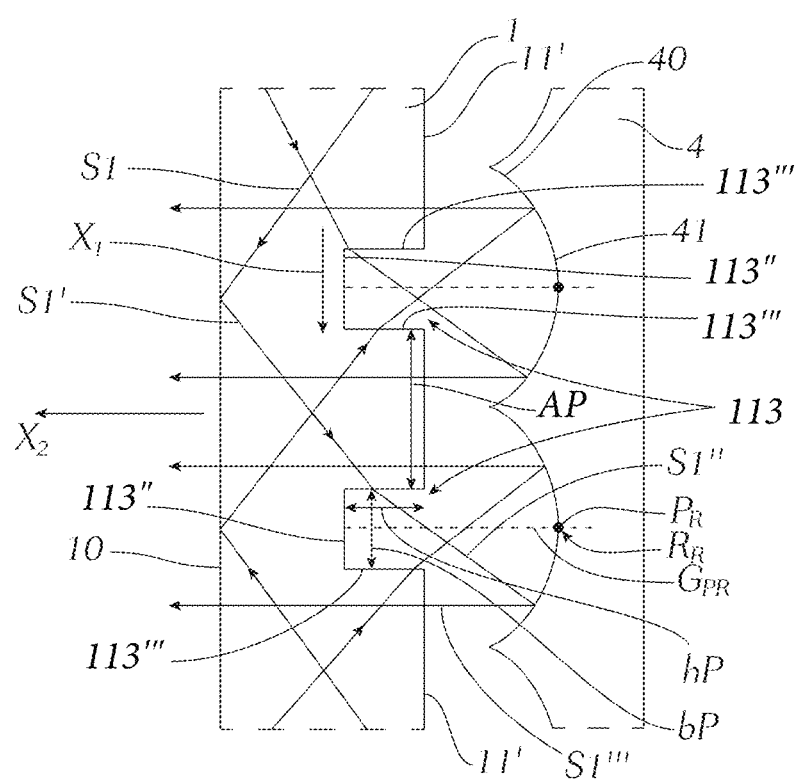
FIG. 9 shows a sectional view of an illumination device along a plane ER in the region of the light guiding body and the reflector surface, in an alternative embodiment.

As shown in FIG. 9, the exit structure 111 of the rear main surface 11 is in the form of profile recesses 113 in flat surface 11'. Like shown in FIG. 4, the reflector surface 40 is formed on a reflector body 4. The reflector surface 40 is formed from reflector partial surfaces 41, wherein a reflector partial surface 41 lies opposite each profile recess 113. The exit structure 111 comprises flat first surfaces 113", which are arranged orthogonal to the second light propagation direction $X_2$, and second flat second surfaces 113''' (side surfaces), which are arranged parallel to the second light propagation direction $X_2$. The profile recesses 113 have height hP (depth) and/or their width bP.

Figure 5:
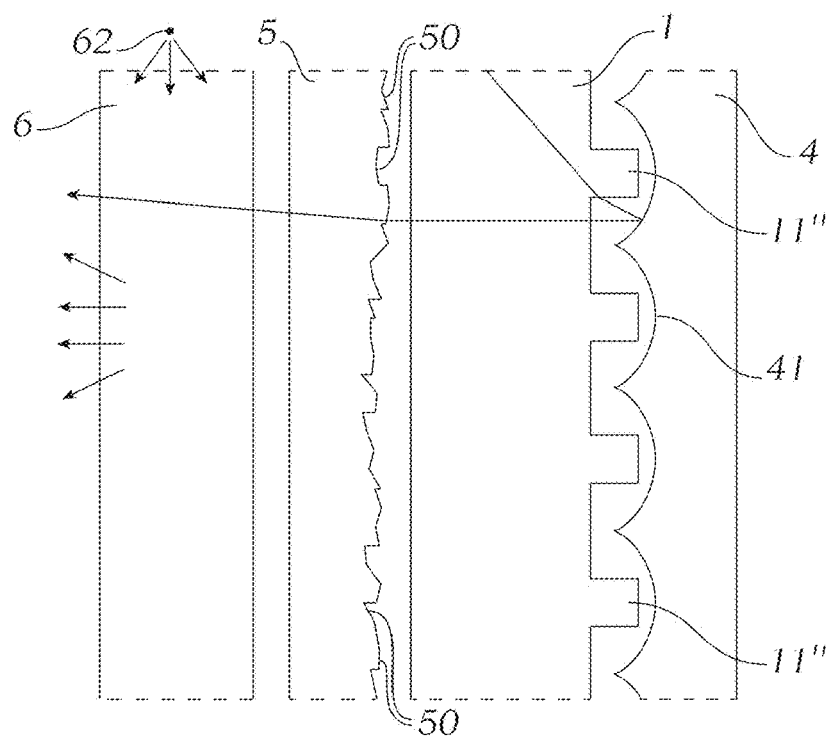
FIG. 5 shows a sectional view of the entire illumination device along the plane ER.

As shown in FIG. 1 and in particular also in FIG. 5, it can also be provided that a further transparent, plate-like light shaping element 5 ("additional first light shaping element") is arranged downstream of the light guiding body 1 as viewed in the second main light propagation direction $X_2$, which light shaping element has a light shaping structure with a plurality of facets 50, which respectively have an inclination to the second main light emission direction $X_2$.

Figure 8:
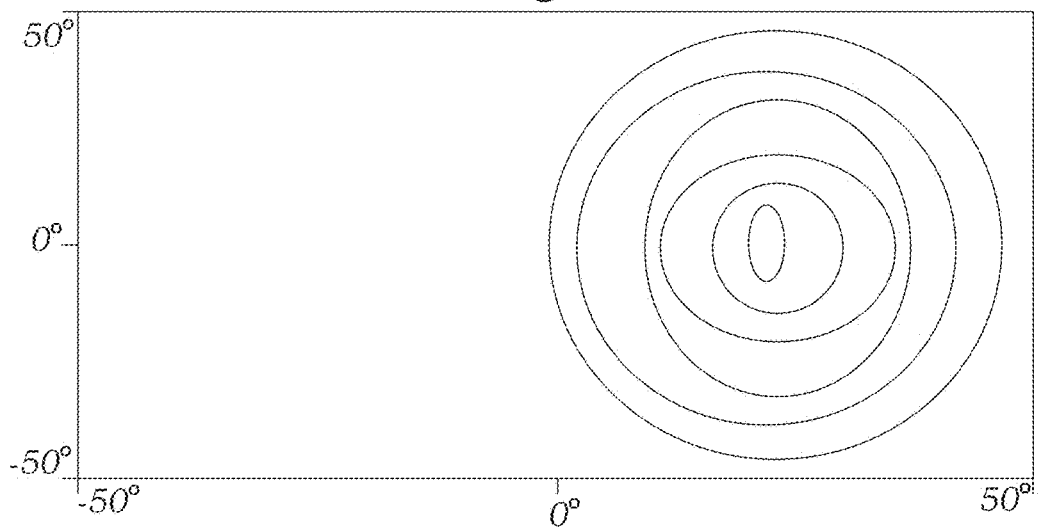
FIG. 8 shows a photometric illustration of a light distribution produced by means of the light rays reflected by the reflector after passing through a light shaping element.

This light shaping element can, on the one hand, further improve the uniformity of the light and, on the other hand, the light shaping structure can also deflect the light in a targeted manner in a desired direction or into a desired region. FIG. 8 schematically shows a light distribution produced with the light coming from the reflector surface 40 after passing through the additional first light shaping element 5. It can be seen that a maximum is maintained in the light distribution, but the light is emitted into a larger angular range.

For example, the individual facets 50 are each flat (transparent) surfaces, and the spatial vector of a facet forms a first, e.g. horizontal angle of inclination and a second, e.g. vertical angle of inclination to the second main light emission direction $X_2$, wherein the angles of inclination of all facets are distributed. It can be provided that the horizontal angles of inclination and the vertical angles of inclination or the values of these angles of inclination are respectively distributed around an expected value, wherein the expected value corresponds to the maximum luminous intensity of the light distribution LV in such a way that light rays that enter the light shaping element 5 and/or exit the light guiding body via facets that have a horizontal and vertical angle of inclination corresponding to the expected value form the maximum luminous intensity of the light distribution, wherein the light shaping structure forms a light entry side and/or a light exit side of the light shaping element 5.

The facets can be arranged in such a way that they are distributed substantially uniformly on the light entry side and/or light exit side of the light shaping element 5 in relation to their respective inclinations.

The light shaping element 5 can modulate the incident, collimated light coming from the reflector surface into a desired light distribution, e.g. for a stop light function or a turn light function.

It can further be provided that a second, transparent, plate-like light guiding body 6 ("additional second light guiding body") is arranged downstream of the light shaping element 5 as viewed in the second main light propagation direction $X_2$, wherein the second light guiding body 6 is preferably designed in such a way that light rays coming from the reflector surface 40 (and light rays passing through the light guiding body 5) are scattered as they pass through this second light guiding body 6.

In particular, it can be provided that one or more further so-called second light sources 62 are provided, which inject light into the second light guiding body 6 via one or more narrow surfaces of the second light guiding body 6, and wherein the second light guiding body 6 is designed in such a way that light injected by the one or more second light sources 62 is scattered, in particular highly scattered, by the light guiding body 6 and exits the light guiding body 6 at least partially in a direction facing away from the reflector surface 40. The second light guiding body 6 has, for example, optics with scattering elements, in particular volume elements, or a scattering, e.g. roughened surface.

Light coming from the reflector surface 40 is also scattered by the second light guiding body 6 (to a lesser extent) whilst the light from the light sources 62 of the second light guiding body 62 is heavily scattered such that these light sources 62 produce a luminous surface.

The illumination device can thus, for example, be used as a design element or to produce a (n) (additional) lighting function that does not have great requirements in terms of intensity or uniformity, for example a position light or rear light.

Although the light coming from the reflector surface 40 is also scattered, a targeted maximum in the intensity distribution can still be achieved thanks to the previous shaping by the light shaping element 5.

This arrangement can thus provide a further, second light function, for example as a design element or lighting function that does not have great requirements in terms of intensity or uniformity, for example as a position light or rear light.

The second light sources and the (first) light sources can preferably be controlled independently of one another.

Light from the first light sources is also scattered and diffuse light is produced, but the facets described and the parabolic reflectors that direct the light rays in parallel can still be used to achieve a targeted maximum in the intensity distribution.

In this optional embodiment, the present invention combines a new approach for an effective optical system for light decoupling, a crystal optical modulator and a volume-scattering material. Each function can be differentiated by the illuminated appearance, e.g. the rear provides a homogeneous illuminated surface, when switched to STOP, for example, the same illumination device has a crystalline appearance and can meet the legal requirements for a STOP signal.

The light guiding body 1 and the two further light guiding bodies 5, 6 match approximately or exactly in terms of their first width (width b1 of the light guiding body 1) and their second width or height (second width b2 of the light guiding body 1) and are arranged in such a way that the respective light exit surfaces run parallel to one another, and the light guiding bodies 1, 5, 6 are arranged in such a way that they cover each other. Neighbouring light guiding bodies 1, 5, 6 can respectively have a distance greater than zero from one another or be directly adjacent to one another.

A very thin arrangement as viewed in a light propagation direction can be achieved with the present embodiment according to the invention, in which it can be ensured at the same time that the front main surface via which the light injected by the light sources is emitted in the desired light propagation direction emits light as uniformly as possible.

In the specific embodiment as shown in the figures, at least two light functions can be produced, for example tail light or stop light function and a cornering light. The use of light sources on several narrow sides of a light guiding body 1, 6 can increase the quantity of light or light sources with different colours can be used on different narrow sides in order to thus be able to achieve various light functions via one light guiding body.

The invention gives rise to a very thin illumination device.

The invention claimed is:
1. An illumination device (100) for a motor vehicle light, the illumination device (100) comprising:
a plate-like transparent light guiding body (1), wherein the light guiding body (1) is delimited by two opposite main surfaces, a front main surface (10) and a rear main surface (11) as well as side surfaces (12, 13, 14, 15); and
one or more light sources (2), wherein the light sources (2) are arranged on at least one narrow side (12), wherein the light emanating from a light source (2) enters the light guiding body (1) via the narrow side (12) on which the light source (2) is arranged and propagates in the light guiding body (1) substantially in a first main light propagation direction ($X_1$) to that narrow side (13) which lies opposite the narrow side (12) via which the light from the light source (2) enters,
wherein the front main surface (10) is configured such that at least some of the light rays (S1), incident on the front main surface (10), of the light propagating substantially in the first main light propagation direction ($X_1$) are totally reflected at the front main surface (10) such that they can strike the rear main surface (11),
wherein the rear main surface (11) has an exit structure (111), and wherein at least some of the light rays (S1') which are totally reflected at the front main surface (10) and which strike the rear main surface (11) exit the light guiding body (1) via the exit structure (111),
wherein a reflector surface (40) is arranged opposite the rear main surface (11),
wherein the reflector surface (40) is designed in such a way that light rays (S1") emerging from the rear main surface (11) and striking the reflector surface (40) are deflected by the reflector surface (40) in the direction of the light guiding body (1), substantially in a second light propagation direction ($X_2$) and the deflected light rays (S1''') pass through the rear main surface (11) and the front main surface (10) of the light guiding body (1) and are emitted into an area in front of the illumination device (100) to form a light distribution (LV),
wherein the exit structure (111) is formed in the rear main surface (11) in the form of profile recesses or in the form of profile elevations (11"), which protrude from the rear main surface (11),
wherein the reflector surface (40) is formed from reflector partial surfaces (41), wherein a reflector partial surface (41) lies opposite each profile recess or each profile elevation (11"), and wherein the reflector partial surfaces (41) are concave in cross-sectional areas ($E_R$) normal to their longitudinal direction ($R_R$), as concave recesses in a reflector element (4).

2. The illumination device according to claim 1, wherein the rear main surface (11) is formed from a flat surface (11'), and/or wherein the front main surface (10) of the light guiding body (1) is a flat surface.

3. The illumination device according to claim 2, wherein the front main surface (10) of the light guiding body (1) is a flat surface, which runs parallel to a flat surface (11') of the second main surface (11).

4. The illumination device according to claim 1, wherein a narrow side (13) which lies opposite a narrow side (12) via which one or more light sources (2) feed light into the light guiding body (1) is designed to be retroreflecting or as a retroreflector (13') such that at least some of the light which propagates in the light guiding body (1) and which strikes the retroreflecting narrow side (13) is reflected back into the light guiding body (1).

5. The illumination device according to claim 1, wherein all light sources (2) are arranged exactly on one narrow side (12), wherein, if there are several light sources (2) on a narrow side (12), these are arranged next to one another, along a longitudinal extension of the narrow side (12).

6. The illumination device according to claim 5, wherein the light sources (2) are arranged such that the main light emission directions of the light emerging from the light sources (2) run parallel to one another.

7. The illumination device according to claim 1, wherein the exit structure (111) comprises first flat surfaces (111"), which are arranged orthogonal to the second light propagation direction ($X_2$), and second flat surfaces (111'''), which are not arranged orthogonal to the second light propagation direction ($X_2$).

8. The illumination device according to claim 1, wherein the profile recesses or profile elevations (11') run transverse to the first light propagation direction ($X_1$), orthogonal to the first light propagation direction ($X_1$).

9. The illumination device according to claim 1, wherein profile recesses or profile elevations (11") extend over an entire first width b1, i.e. from a narrow side (14) to the narrow side (15) opposite this narrow side (14), in terms of their longitudinal extension, and/or profile recesses or profile elevations (11") are provided in or on the flat surface (11') over an entire second width (b2), which extends from a narrow side (12) to the narrow side (13) opposite this narrow side (12).

10. The illumination device according to claim 1, wherein:
all profile recesses or all profile elevations are identical in terms of their height and/or width, and/or
all profile recesses or profile elevations respectively have the same distance to their neighbouring profile recesses or profile elevations, and/or
all profile recesses or all profile elevations run parallel to one another.

11. The illumination device according to claim 1, wherein each reflector partial surface (41) extends over the entire longitudinal extension of the associated profile recess or profile elevation in terms of its longitudinal extension, and wherein the reflector partial surfaces (41) run in the longitudinal direction ($R_R$) parallel to a longitudinal direction ($R_P$) of the associated profile recess or profile elevation (41).

12. The illumination device according to claim 1, wherein in cross-sectional areas ($E_R$) normal to the longitudinal direction ($R_R$) of the reflector partial surfaces (41), the profile recesses or profile elevations (41) are respectively formed mirror-symmetrically with respect to a line of symmetry ($G_{PR}$) of the reflector partial surface (41) associated with them.

13. The illumination device according to claim 1, wherein the profile recesses or profile elevations (11") have a rectangular, square or trapezoidal cross-section.

14. The illumination device according to claim 1, wherein in the cross-sectional areas ($E_R$), the reflector partial surfaces (41) have a parabolic shape.

15. The illumination device according to claim 1, wherein all reflector partial surfaces (41) are identical in terms of their shape, and/or neighbouring reflector partial surfaces (41) are directly adjacent to one another and respectively converge in a common edge.

16. The illumination device according to claim 1, wherein a transparent, plate-like light shaping element (5) is arranged downstream of the light guiding body (1) as viewed in the second main light propagation direction ($X_2$), which light shaping element has a light shaping structure with a plurality of facets (50), which respectively have an inclination to the second main light emission direction ($X_2$), wherein:
the spatial vector of a facet preferably forms a first angle of inclination and a second angle of inclination to the second main light emission direction ($X_2$), wherein the angles of inclination of all facets are distributed in such a way that the horizontal angles of inclination and the vertical angles of inclination are respectively distributed around an expected value, wherein the expected value corresponds to the maximum luminous intensity of the light distribution (LV) in such a way that light rays that enter the light shaping element (5) and/or exit the light guiding body via facets that have a horizontal and vertical angle of inclination corresponding to the expected value form the maximum luminous intensity of the light distribution, wherein the light shaping structure forms a light entry side and/or a light exit side of the light shaping element (5), and/or
the facets are arranged in such a way that they are distributed substantially uniformly on the light entry side and/or light exit side of the light shaping element (5) in relation to their respective inclinations.

17. The illumination device according to claim 1, wherein a second, transparent, plate-like light guiding body (6) is arranged downstream of the light shaping element (5) as viewed in the second main light propagation direction ($X_2$), wherein the second light guiding body (6) is designed in such a way that light rays coming from the reflector surface (40) are scattered as they pass through the second light guiding body (6), wherein one or more further so-called second light sources (62) are provided, which inject light into the second light guiding body (6) via one or more narrow surfaces of the second light guiding body (6), and wherein the second light guiding body (6) is designed in such a way that light injected by the one or more second light sources (62) is scattered by the light guiding body (6) and exits the light guiding body (6) in a direction facing away from the reflector surface (40).

18. The illumination device according to claim 1, wherein a light injection element (3) is respectively arranged between each light source (2) and the light guiding body (1), wherein the light emitted by a light source (2) enters the light injection element (3) associated with this light source (2) and is injected by it into the light guiding body (1) such that the light propagates in the light guiding body (1) substantially in the first main light propagation direction ($X_1$).

19. A motor vehicle light having at least one illumination device (100) according to claim 1, wherein the motor vehicle light is designed as a motor vehicle headlight or tail light or is arranged in a motor vehicle headlight or in a tail light.

\* \* \* \* \*